United States Patent [19]
Salter et al.

[11] Patent Number: 6,001,244
[45] Date of Patent: Dec. 14, 1999

[54] PERFORMANCE WATER PURIFICATION SYSTEM

[75] Inventors: Edwin Christopher Salter, West Los Angeles, Calif.; Anthony Pipes, 15012 Redhill, Suite "A", Tustin, Calif. 92780

[73] Assignee: Anthony Pipes, Irvine, Calif.

[21] Appl. No.: 09/113,786

[22] Filed: Jul. 10, 1998

[51] Int. Cl.$^6$ .............................. B01D 61/12; B01D 61/04
[52] U.S. Cl. ............................ 210/104; 210/90; 210/134; 210/141; 210/195.2; 210/259; 210/257.2
[58] Field of Search ........................... 210/90, 96.2, 104, 210/105, 108, 134, 138, 141, 143, 195.1, 195.2, 192, 256, 257.2, 258, 259, 121, 122, 641, 651, 652, 805, 900

[56] References Cited

U.S. PATENT DOCUMENTS

| | | | |
|---|---|---|---|
| 4,626,346 | 12/1986 | Hall | 210/257.2 |
| 4,784,771 | 11/1988 | Wathen et al. | 210/257.2 |
| 5,043,066 | 8/1991 | Miller et al. | 210/257.2 |
| 5,282,972 | 2/1994 | Hanna et al. | 210/257.2 |
| 5,510,798 | 4/1996 | Al-Samadi et al. | 210/641 |
| 5,520,816 | 5/1996 | Kuepper | 210/257.2 |

FOREIGN PATENT DOCUMENTS

1445799  8/1976  United Kingdom ................ 210/257.2

*Primary Examiner*—Joseph W. Drodge

[57] ABSTRACT

The invention relates to a new water purification system design that uses reverse osmosis membrane filtration and optional ultra violet light treatment. The new system creates the potential for achieving a higher standard of performance for point-of-use reverse osmosis systems. The system provides for a multiple pass, multiple barrier method for delivering freshly treated, high-quality water from the system. A microprocessor controlled operating system maintains the system within a narrow range of optimal performance at all times. The system provides for two water storage tanks, each equipped with its own pump. With an operating system sequence of alternating flow cycles, an internal state of continuous water movement and dynamic treatment is created and maintained within the elements of the system. The system dynamics contribute to microbial control throughout the system. The system incorporates cross flow filtration in all elements. Both hardware and software innovations contribute to the improved design and operational performance of the system. The operational aspects of the system contribute to the reduced operational costs, high contaminant rejection and a fifty percent water recovery.

16 Claims, 5 Drawing Sheets

PERFORMANCE WATER PURIFICATION SYSTEM

BACKGROUND

1. Field of Invention

The invention relates generally to a system for purifying a liquid, and specifically to (1) membrane treatment processes used in a water purification system, and (2) a microprocessor controlled operating system to improve the performance of a water purification system utilizing reverse osmosis (RO) filtration and ultra-violet light (UV) treatment.

2. Description of Prior Art

Domestic point-of-use (POU) water treatment technologies have been developed to improve the quality of drinking water supplies, and are used to process a small fraction (one to two percent) of supplied tap water. Various POU treatment technologies improve drinking water quality. Reverse osmosis filtration is a widely used and versatile separation process, and it is regarded as one of the most effective processes for providing quality drinking water.

The use of very fine RO membranes is, however, subject to a number of constraints. In general, RO membranes should be used in conjunction with other filtration elements. In fact, RO membrane units should be configured in a treatment system that must also provide for the pre-filtration of tap water, the production and storage of RO product water, and the post-filtration of the stored RO water prior to deliver via a faucet. RO water storage is needed because household water is supplied only at low pressure, that is, 45–60 pounds per square inch (psi). At low pressures, RO product water cannot be produced at high delivery flow rates that can directly supply a faucet. The large surface area membranes that would be required are costly and not practicable for POU applications.

In prior art RO systems, the energy required to run an RO system is supplied indirectly by the hydraulic pressure in the water supply line. While this mode of RO system operation (which does not require a supply of electricity) is convenient, it nevertheless imposes a number of constraints on the performance of prior art systems. In particular, the use of the water supply line pressure to drive the water purification system limits the operational performance of the RO membrane itself. Three variable factors that can adversely affect an RO membrane operation are (1) the incoming water supply pressure, (2) the membrane flux ratio (defined by the ratio of the membrane reject flow to the product water flow through the membrane), and (3) the back pressure transmitted to the membrane from the storage device. Virtually all prior art RO systems use a bladder tank for the storage of RO product water. The working pressure of the RO membrane is the supply pressure to the membrane unit less the bladder tank pressure that must be overcome to force more water into the tank. High internal tank pressure, when the tank is full, permits a good water delivery rate to a faucet but a poor RO production rate when the RO water is stored. When the tank storage is low, water delivery from the bladder tank is poor, but RO water production to the bladder tank is high. This arrangement for operating prior art RO systems results in a constant compromise in system performance.

The performance limitations of elementary RO systems are basically caused by (1) intermittent or low water supply pressure, (2) inactivity of the system during periods when water is not drawn from the system, storage tank back pressure, and (3) the operational use of less than recommended flux ratios. Low flux ratios are used to reduce high water wastage, but the arbitrary reduction of reject flows can lead to deterioration of treatment elements in the system. Performance limitations have been addressed by providing optional add-on components to enhance system performance. These extra components include pressure booster pumps, shut-off valves and devices to utilize the energy lost in the reject flow. The basic design and operation of prior art systems has not been changed by the addition of these technical fixes.

Figure 1:
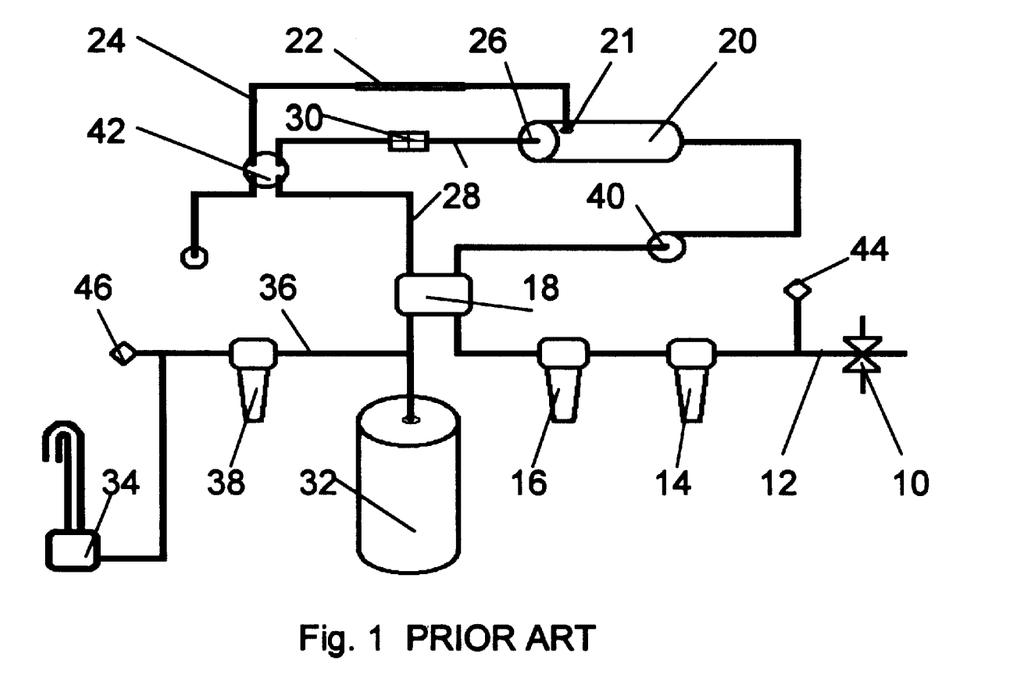
FIG. 1 is a schematic view of an Advanced Prior Art Reverse Osmosis Water Purification System.

An advanced prior art system for domestic water purification is illustrated in FIG. 1. A branching feed valve 10 connects the system to a pressurized supply of feed water. A conduit 12 connects the feed valve 10 to a pre-filter 14, which removes contaminants such as suspended particles and dissolved chemical contaminants which can have a detrimental effect on the subsequent membrane treatment. Pre-filters are typically designed to capture particles greater than five microns in size. After the pre-filter 14, the water is passed through a carbon filter 16 which adsorbs organic or chlorinated chemicals in the water. From the carbon filter 16 the water is passed via a shut-off valve assembly 18 to the membrane unit 20. With cross-flow filtration, the Reverse Osmosis membrane contained in the membrane unit 20 will remove macromolecules and ionic particles from the pre-filtered water, and the concentrated contaminated stream can be directed through outlet 21 to a drain through a flow restriction valve 22 and a waste conduit 24. The purified product water or permeate is directed through outlet 26, and along conduit 28 which is provided with a check valve 30. The product water then passes through the shut-off valve assembly 18 and flows on to the storage tank 32. A typical storage tank 32 is a bladder tank. An air chamber in the tank is compressed as the tank fills with water from the membrane unit 20, and the resulting air compression causes pressurization in the water compartment of the bladder tank. The bladder tank pressure induced by the storage of treated water produces flow at the faucet 34 when the faucet is opened. The stored water is forced into conduit 36 and through the carbon filter 38 which provides a final "polishing" of the dispensed water. A pressure pump 40 and a booster permeate pump 42, which can use the waste water line pressure to boost the pumping pressure, can be configured as optional extras to improve the performance. Water conductivity sensors 44 in conduit 12, and 46 in conduit 36, are used in advanced prior art systems to monitor the relative removal of mineral ions by the Reverse Osmosis membrane 20. This monitoring through the paired sensors 44 and 46 provides a relative indication of water quality improvement, which is used to display the proper functioning of the RO water purification system.

OBJECTS AND ADVANTAGES

The starting point for establishing a high degree of process control over the operation of a water purification system using RO filtration is to provide a reliable energy source for driving the system. The reliability and predictability of system performance can be further improved by eliminating the back pressure that, in prior art systems, originates from the RO water storage vessel. For increased reliability, the system operation must be made independent of any pressure fluctuation or variability in the water supply line to which the system is connected.

The improved performance system creates the potential for achieving a new higher standard of performance for a point-of-use RO system which exhibits multiple advantages over prior art systems. The objects and advantages of the invention are derived from an economically determined combination of both new hardware and software components. The innovations identified below resolve the problems associated with even the advanced prior art RO systems.

Design Considerations:

(1) The energy source selected for driving the improved performance system is the household electricity supply. This is transformed down from a 110 or 220 volts supply to a 24 volt energy source to drive the system. The electrical energy source provides the basis for continuous operation of the improved performance system.

(2) The improved performance system provides for two water storage tanks. The available pressure in the water supply line is needed to produce only a minimal flow rate for the filling and subsequent re-supply of the system's water holding tank. A pressure pump is used to pump the supplied water through the system, and to pump wastewater to the drain. The flow velocities and hydraulic pressures within the system are determined by the pump characteristics and are independent of the pressure in the water supply connection.

(3) The product water is produced and supplied to a separate storage tank. A delivery pump in the product water tank is used to supply RO product water to the faucet. The delivery pump is activated in response to the turning on of the faucet. The faucet incorporates a manually operated regulating valve, which produces a variable delivery flow rate. The pressure from the delivery pump is sufficient to allow for the installation of the system as a countertop, wall-mounted, or under-the-sink model. The RO water delivery rate is quite independent of the level of storage in the RO product water tank.

(4) The pump in the product water tank is used to circulate product water back within the system in a reverse flow direction. This regular action and transfer of product water back to the primary water holding tank creates a non-full condition in the purified water tank and a subsequent need to produce more product water. The flush cycles are initiated on a regular basis to maintain and clean the system channels and treatment units.

(5) All the conduits between the pre-filter unit and the membrane unit and between the two water storage tanks are embodied in a sealed manifold. The manifold forms the lid of the two storage tanks, which are cylindrical in shape and concentrically, arranged with the water supply tank inside the RO product water tank.

(6) The water supply tank and the RO product water tank are both freely vented to the atmosphere through separate air-filter seals that prevent the intrusion of aerobic bacteria into the water tanks. The manifold is attached to the tanks by means of an air-tight seal.

(7) A 25 micron strainer unit is incorporated into the manifold so that large particulates are filtered and removed from the system's supply water. This strainer is designed for easy removal and cleaning when necessary.

Operating System Considerations:

(8) The operation of the system can be maintained within a narrow range of optimal performance that is independent of the state of the water supply system and the storage condition of the water purification system.

(9) Through microprocessor control, the water purification system is maintained in a continuous treatment-recycling operation, and it is not subject to static water conditions with the resultant water stagnation associated with non-use in prior art systems.

(10) With an operating system sequence of alternating flow cycles, an internal state of continuous water movement and dynamic treatment is created and maintained within the elements of improved performance system.

(11) The system design and operating system provides for a multiple-pass, multiple barrier treatment method for delivering treatment-fresh high quality water from the system. Even when RO water is not drawn from the system (for example, during the night), the treated RO product water will be pass through treatment elements many times under process-controlled design conditions that ensure maximum contaminant removal.

(12) The improved performance system design incorporates a cross-flow pre-filter unit and a cross-flow RO membrane unit, with the option including an ultra-violet (UV) light treatment unit additional microbial purification of unsafe supply water.

(13) Despite its virtually constant functioning, the pre-filter processes only low volumes of source water contamination since the same water is re-circulated. The purging of wastewater is based on strict volume criteria encountered during the operation of the system. The actual recovery (computed as the percentage of RO product water delivered to supply water delivered) produced by the system is 50 percent. This operational level of recovery improvement is ten times better than many prior art systems.

(14) Cross-flow pre-filtration allows for the return of water to the supply tank that has not passed through the pre-filter. The water is part of the pre-filter reject flow and still retains its disinfection residual. The disinfection residual in the pre-filter return flow contributes to microbial control in the source water tank.

(15) With the conservative reuse of reject water and the multi-pass treatment process provided through the operating system, the pre-filter provides the combined functions of the pre-filter and the post-filter in prior art RO systems. The system operation greatly extends pre-filter life, as compared with the life of prior art pre-filters, and provides for virtual life of the RO membrane. The most favorable state of the RO membrane is continuous operation, either in production or when being back-flushed with RO product water.

(16) The product water flush operation is achieved by directing the return flows through relatively unrestricted channels linking the product water tank and the water supply tank. This routing of return flow creates the high flows and flow velocities that help to keep clean the treatment elements in the system and to provide for the regular and highly beneficial preventative system maintenance.

The above hardware and software innovations both contribute to the improved design and optimum operational performance of the system, which is characterized by its high contaminant rejection, and high water recovery. The improved system performance greatly contributes to reduced operational costs. Further objects and advantages of the invention will become apparent from consideration of the drawings and ensuing descriptions.

LIST OF REFERENCE NUMERALS

FIG. 1

| | | |
|---|---|---|
| 10 Feed valve | 22 Restriction valve | 36 Conduit |
| 12 Conduit | 24 Waste conduit | 40 Pressure pump |
| 14 Pre-filter | 26 Outlet | 42 Permeate pump |
| 16 Carbon filter | 28 Conduit | 44 Conductivity sensor |
| 18 Shut-off valve | 30 Check valve | |
| 20 Membrane unit | 32 Storage tank | 46 Conductivity sensor |
| 21 Outlet | 34 Faucet | |

FIGS. 2, 3, 4

| | | |
|---|---|---|
| 100 Inlet Conduit | 176 Channel | 500 Permeate Tank |
| 102 Branching Clamp | 178 Non-Return Valve | 502 Delivery Pump |
| 104 Coupling | 180 Solenoid Valve | 520 Level-Control Float |
| 106 Manifold Channel | 190 Channel | |
| 108 Strainer | 192 Pressure Switch | 530 Water Level |
| 110 Solenoid Valve | 200 Retentate Tank | 540 Water Level |
| 120 Outlet Channel | 210 Delivery Pump | 550 Vent Plug |
| 130 Channel | 220 Level-Control Float | 600 UV Unit |
| 132 Solenoid Valve | 222 Level-Control Float | |
| 134 Channel | 230 Water Level | |
| 136 Manifold Coupling | 240 Water Level | |
| 138 Channel | 250 Vent Plug | |
| 140 Clamp | 300 Pre-Filter | |
| 142 Coupling | 302 Internal Chamber | |
| 144 Channel | 304 Housing | |
| 146 Channel | 306 End Cap | |
| 148 Restriction Channel | 308 Ceramic Membrane | |
| 150 Channel | 310 Carbon Block | |
| 152 Channel | 312 Annular Passageway | |
| 154 Channel | 314 Compression Sponge | |
| 156 Channel | 316 Filtration Media | |
| 158 TDS Probe | 318 Filtrate Outlet | |
| 160 Channel | 320 Annular Passageway | |
| 162 Channel | 322 Annular Passageway | |
| 164 Conduit | 324 Feed Holes | |
| 166 Faucet | 326 Feed Water Inlet | |
| 170 Channel | 328 Reject Outlet | |
| 172 Channel | 400 Membrane Unit | |
| 173 Coupling | 402 Inlet Port | |
| 174 Restriction Channel | 404 Permeate Outlet | |
| 175 Channel | 406 Reject Outlet | |

SUMMARY

The present invention consists of a uniquely configured water purification system that exhibits improved internal control, monitoring and operational performance characteristics. The operation of the cross-flow filtration system is governed by a microprocessor that provides for essentially continuous water treatment in a sequenced operation that exhibits a pattern of alternating flows.

DESCRIPTION OF INVENTION

An embodiment of the invention is described, by way of example only, with reference to the following drawings provided in FIGS. 2, 3, 4 and 5. The Improved Performance Water Purification System is illustrated schematically in FIG. 2.

Figure 2:
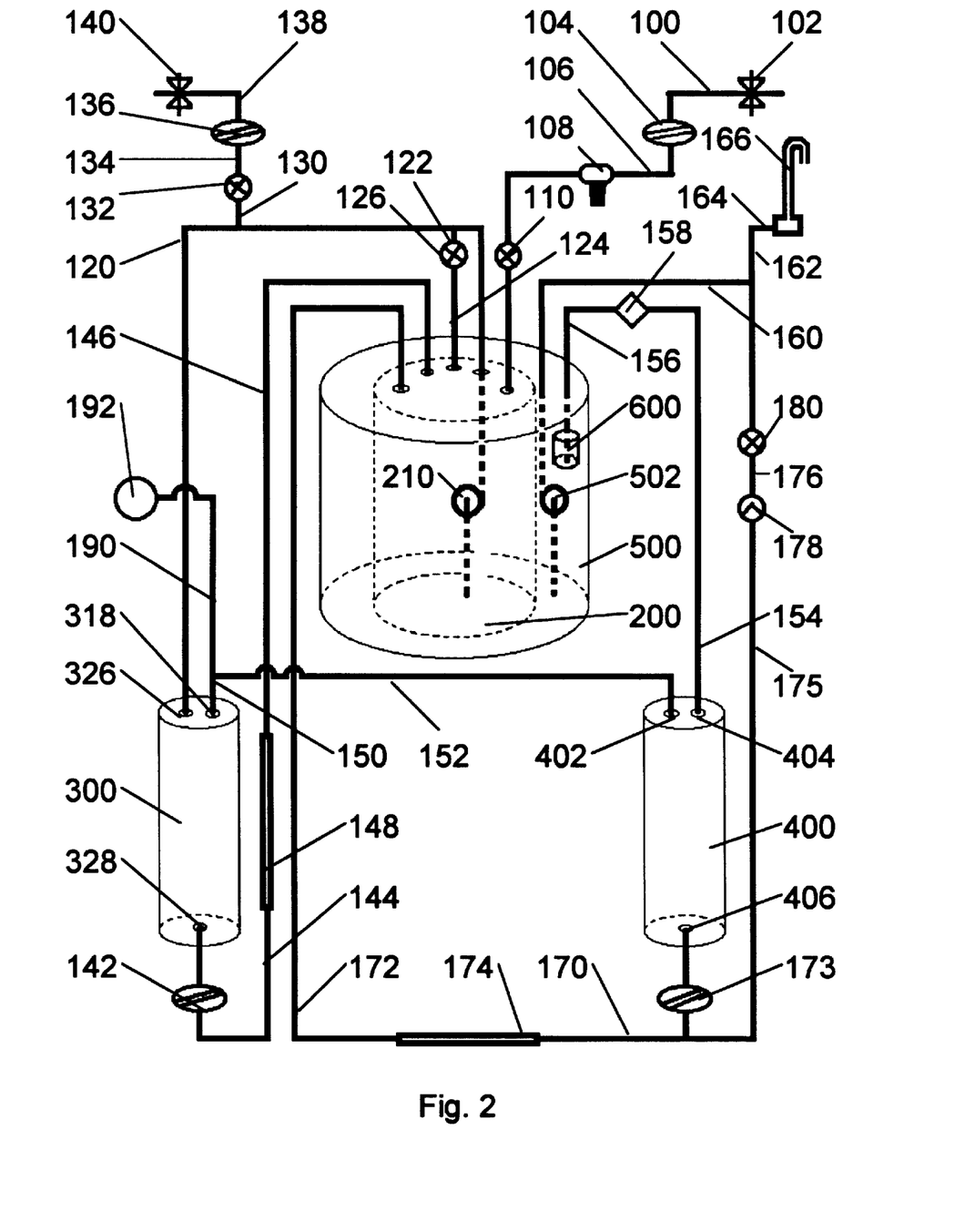
FIG. 2 is a schematic view of an Improved Performance Water Purification System.

The improved performance system incorporates two concentrically arranged water storage tanks with a top sealing manifold which contains ports and internal channels to facilitate the exchange of water between the tanks, the transfer of supply water to the system, and the delivery of the purified water from the system. The inlet conduit 100, which supplies the water to the system, is connected to a pressurized supply of water by a branching clamp 102. The water supply is connected to the system manifold by means of a coupling 104. The coupling 104 is further connected to a sealed manifold channel 106 which conducts the incoming flow of water via a strainer 108 and a solenoid valve 110 to a water retentate storage tank 200. The retentate storage tank 200 is further connected by an outlet channel 120 and to a pre-filter 300. This outlet conduit 120 is connected to a pressure delivery pump 210 contained within the water storage tank 200. The outlet conduit 120 also leads to a channel 130 which includes a solenoid valve 132. The solenoid valve 132 is connected to a channel 134 and to an exit manifold coupling 136. The coupling 136 is connected to a channel 138 which is connected to a clamp 140 located on a waste water pipe. The system operation during which permeate water is pumped through the improved performance system in a reverse flow direction takes less than five percent of the time required for permeate production.

In normal permeate production, the pre-filter 300 provides cross-flow microfiltration for the water pumped from the retentate tank 200. The water enters the pre-filter 300 via the inlet connection 326. Inside the pre-filter, the axial flow (reject water) exits the pre-filter 300 via the waste outlet connection 328. The pre-filter waste outlet 328 is attached to a coupling 142 which allows the reject water to pass through channels 144 and 146 to return to the retentate tank 200. The retentate tank 200 stores the returned water which mixes with the water supplied from the pressurized external water supply through the manifold channel 106. Channels 144 and 146 are connected through a flow restriction channel 148. A further branching of conduit 120 is provided to allow water that is pumped in the reverse direction through the pre-filter 300, and that exits through the pre-filter connection 326, to be returned to the retentate tank 200. Conduits 122 is branched from conduit 120 and is connected to conduit 124 via a solenoid valve 126.

Inside the pre-filter 300, the radial flow (filtered water) exits the pre-filter via the filtrate outlet connection 318, and passes through channels 150 and 152 to the RO membrane inlet port 402. The RO membrane in the membrane unit 400 acts as a flow restrictor for the flow in channels 150 and 152. The filtrate outlet channel 150 from the pre-filter 300 is branched to a channel conduit 190 which is attached to a pressure differential switch 192 which is mounted above the manifold and attached to an electronics control board. The pressure differential switch 192 is activated when the water pressure in channel 150 falls below a predetermined level (for example, 35 pounds per square inch (psi).

The membrane unit 400 has a permeate outlet 404 for the purified RO water, and a reject outlet 406 for the RO waste water. The permeate is discharged to the permeate tank 500 via channels 154 and 156. The purified water is retained in the permeate tank 500 but it may be circulated internally throughout the water purification system or delivered to the faucet 166. The connection between channels 154 and 156 contains a total dissolved solids (TDS) probe 158 which measures the conductivity of the residual mineral content in the permeate water. The water conductivity is a measure of water quality. As the permeate water slowly flows into the permeate tank 500 it is passed through an ultra-violet light source unit 600.

The permeate tank 500 and the retentate tank 200 are both freely vented to the atmosphere. A small submersible delivery pump 502 is located in the tank and supplies water to the permeate exit channel 160 for circulation and delivery to the faucet 166. The exit channel 160 is connected to channel 162, which in turn is connected to a branched conduit 164 that supplies the delivery faucet 166. The delivery faucet 166 is provided with a sensor or rocking switch, which is activated by turning on the faucet.

The RO membrane reject water outlet 406 is attached to a coupling 173 which is further linked with branched channels 170 and 175. Channel 170 is joined to channel 172 through a flow restriction channel 174, and returns the membrane reject water to the retentate tank 200. Channel 175 connects the membrane unit outlet 406 to channel 176 which is further connected through channel 160 to the permeate tank 500. The channel which incorporates sections 175 and 176 and the connection to channel 160, includes a non-return valve 178 and a solenoid valve 180.

Figure 3:
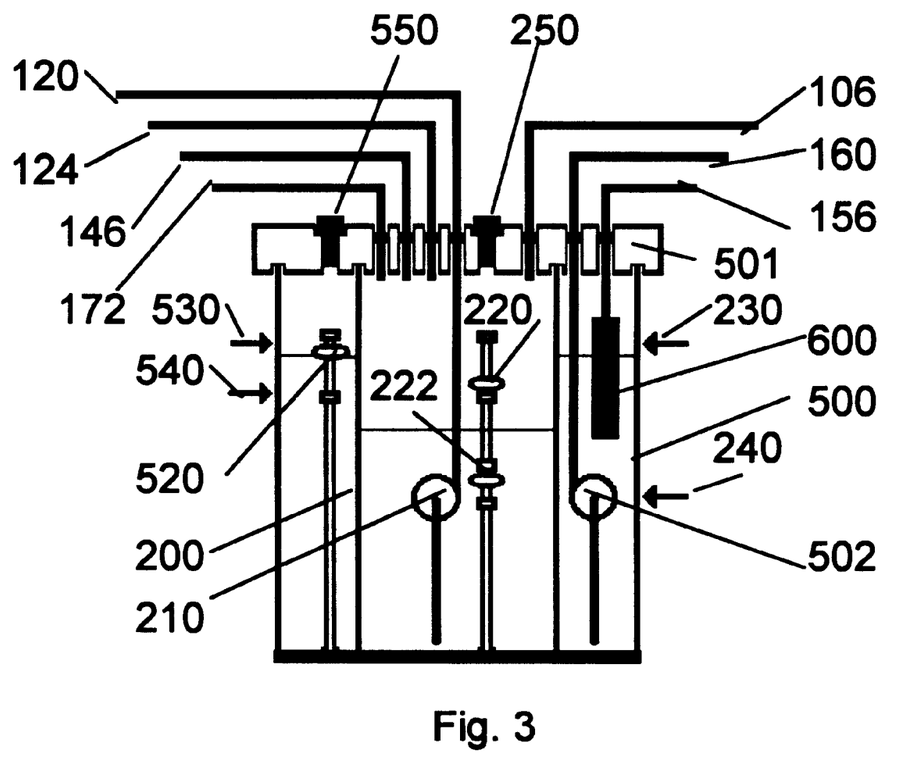
FIG. 3 is a cross-sectional view of the Pre-filter.

A cross-sectional view of the storage tanks and manifold, which are part of the improved performance water purification system, is shown in FIG. 3. FIG. 3 further illustrates schematically the hydraulic paths, referred to in FIG. 2, that are conducted through the manifold. The retentate tank 200 and the permeate tank 500 are provided with control floats that can activate electrical transmissions when the volume of water in the respective tanks reaches specified storage levels. Level-control floats 220 and 222 are shown schematically in the interior retentate tank 200, and the level-control float 520 is shown situated in the permeate tank 500. These three floats 220, 222 and 520 transmit signals to an electronic control board when the water reaches designated levels 230 and 240, and 530 and 540, in the retentate and permeate tanks, respectively.

The top permeate tank level 530 represents a virtually full condition in the permeate tank. The lower control level 540 is determined to allow for transfer to the retentate tank of the volume of permeate water used in a single system flush operation. Generally, the volume of water used in a flushing operation is about one liter. The top retentate tank level 230 represents a near full storage level. A fixed height below the full storage condition has to be maintained in the retentate tank at all times. The required fixed head reserve is five centimeters (two inches). In addition, an operational storage reserve is required to accommodate the volume of permeate water that is transferred back to the retentate tank during a flush operation (about one liter of permeate water). The back-flush operation is routinely activated to maintain and keep clean the hydraulic elements of the system—the treatment units and hydraulic pathways. The retentate tank 200 and the permeate tank 500 are vented to the atmosphere through plugs 250 and 550, to allow for the dynamic fluctuations in water storage volumes. The plugs are made of ceramic material with pore sizes of 0.1 to 0.2 microns. The construction of the plugs allows for the free flow of air, and the filtering of aerobic bacteria.

Additional features of the improved performance system include three LED displays that are located on the mounting of the faucet 166. The system microprocessor and control board are connected so as to receive signals from the control floats 230, 240 and 520; the off/on switch of the delivery faucet 166; the water conductivity probe 158; the solenoid valves 110, 126, 132, and 180; the pressure differential switch 192; and the pumps 210 and 502.

Figure 4:
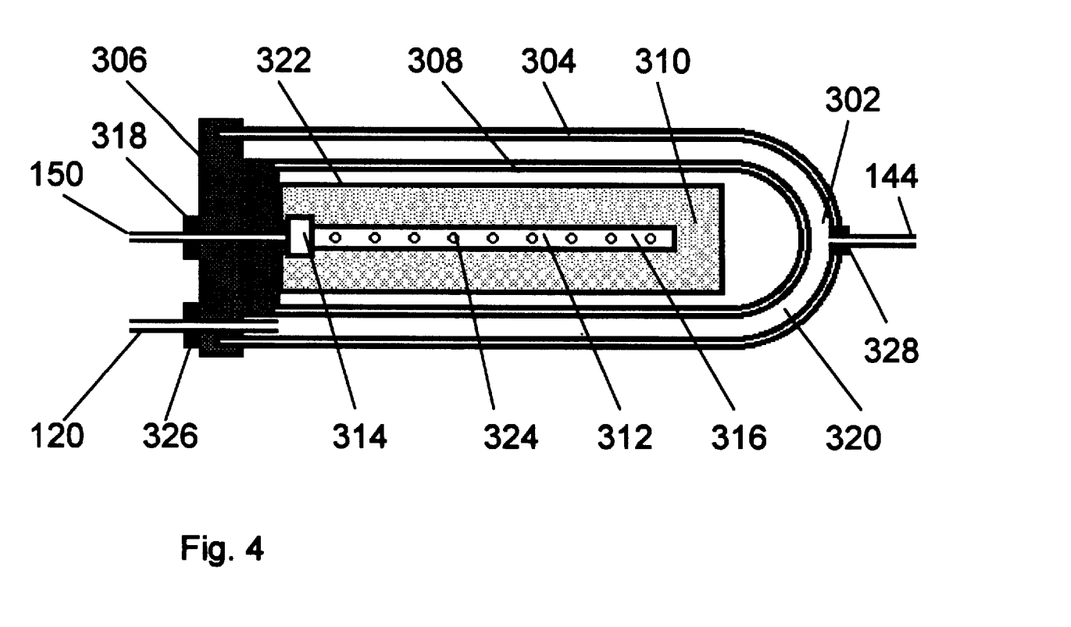
FIG. 4 is a cross-sectional view of the Ultra-Violet Light Unit.

The pre-filter 300 is illustrated in cross-section in FIG. 4. The pre-filter, 300, comprises an internal chamber, 302, inside a housing 304 formed for example of plastics material, closed by end piece 306. Within the housing, 304, there are arranged an outer tubular candle of silver impregnated one micron ceramics material 308 containing a tubular sleeve of carbon block 310 arranged concentricity therein and a ½ inch inner annular passageway 312 blocked off at one end, and containing a fine gauze pad and compression sponge 314 at the other end; a pre-determined mixture of KDF, calcite and polymeric absorbent media 316 is packed into the annular passageway 312. The annular passageway 312 comprising 314 and 316 directs the filtered water to a first pre-filter outlet 318. An annular passageway 320 is defined between an outer surface of the outer sleeve 308 and an inner surface of the housing 304. A further annular passageway 322 is defined between the outer surface of the carbon block 310 and the inner surface of the ceramic sleeve 308.

A series of vertical annular passageways 324 are inserted along the length of annular passageway 312 to direct the filtered water to the inlet side of 312 to ensure that all filtered water is treated by all the filter media. An inlet feedwater connection 326 in the end piece 306 communicates with the annular passageway 320. At the outlet side, an outlet connection 328 in the filter housing 304 communicates with the passageway 320. Typically, in a filter of overall dimension of 10 inches length, 3 inches in diameter, the passageway 320 is ¹⁄₃₂ inch in lateral dimension and the passageway 322 is approximately ⅛ inch in lateral dimension. The series of vertical annular passageways 324 are typically ⅛" in lateral dimension.

Figure 5:
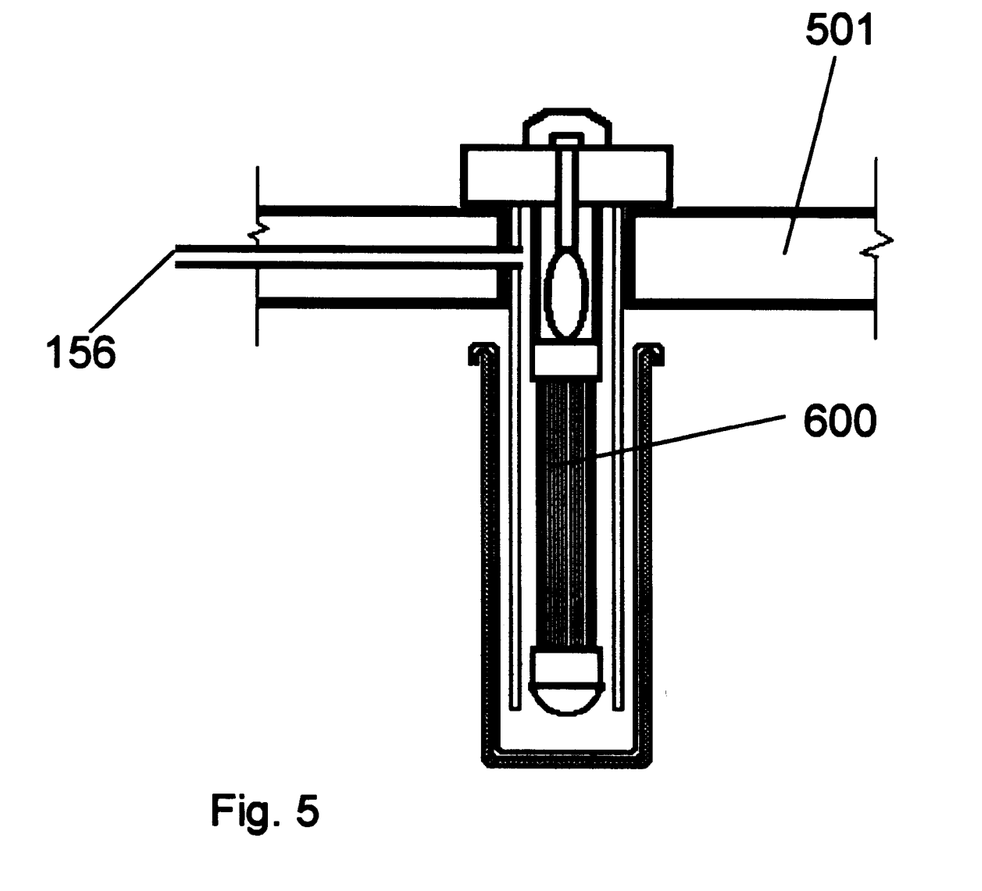
FIG. 5 is a cross-sectional view showing Float-Level Sensors in Storage Tanks

FIG. 5 shows the construction of the ultra violet lamp configuration. Permeate water from the membrane enters the lamp unit via channel 156 and the water passes the ultra violet lamp which is mounted concentrically inside a quartz sleeve. The water then flows up the outside the quartz sleeve and into the permeate tank via an outlet channel. The quartz sleeve is further mounted concentrically inside a stainless steel sleeve which is mounted inside an injection molded cavity inside the permeate tank 500. This insures that the treated water gets a double pass over the UV light source. The relatively slow permeate flow from the membrane (1 pint in seven minutes) provides a greatly extended contact with the UV light.

The system is provided with a source of electricity that is reduced to a 24 volt supply with a transformer. The overall dimensions of the water purification system are approximately 12 inches by 13 inches by 15 inches. The dry components, including the microprocessor and the electronics, the solenoid valve, the TDS probe, the pressure differential switch and circuitry, are arranged on the manifold. The manifold also incorporates the storage tank vents, the float level sensors and the faucet in the counter top model.

Operation of Invention

The operation of the Improved Performance Water Purification System, is explained with reference to FIGS. 2 and 3. For the initial condition of the system, it is assumed that both the retentate storage tank 200 and the permeate storage tank 500 are empty. This initial condition causes the system microprocessor to transmit electrical signals to open solenoid valve 110 and to close solenoid valves 126, 132, and 180. The system then draws supply water through conduit 106 to the retentate 200 until the level of the water in the tank reaches the tank full level 230. At this point, an electrical signal is sent to the system microprocessor situated on the electronic control board. The microprocessor then sends an electrical signal which closes solenoid valve 110, and a further instruction is dispatched to activate pump 210 situated in the retentate storage 200.

Water is pumped from the retentate tank 200 at the design pressure created by pump 210, through channel 120 and into the pre-filter 300 through entry port 326. The hydraulic design of the system causes a pre-arranged portion of the pre-filter flow to exit the pre-filter 300 via the water reject exit port 328, and to return to the retentate 200 through channels 144 and 146 and the flow restriction channel 158. The remaining treated portion of the pre-filter inflow exit the pre-filter 300 via the filtrate exit port 318 and flows via channels 150 and 152, and enters the RO membrane unit 400 through entry port 402.

The partitioning of flows in the RO membrane unit 400 is further determined by the flow restriction channel 148 and 174. The RO permeate flow exits the RO membrane unit 400 via exit port 404 and passes through channels 154 and 156 and enters the permeate storage tank 500 via the ultra-violet light (UV) unit 600. The RO membrane unit reject water exits via port 406 and is returned to the retentate tank 200 via channels 170 and 172 and the flow restriction channel 174.

The purified water production continues until the volume of water held in the retentate tank 200 is reduced to the half-full level 240. At this point, an electrical signal is transmitted to the system microprocessor, and a return electrical signal is dispatched which causes solenoid valve 132 to open. This activates pressure pump 210, and the water remaining in the retentate 200 is then pumped to the drain outlet 140 via channels 120, 130, and 138. (A small portion of the water from the retentate tank 200 will be pumped through channel 120 to the pre-filter 300 and back to the retentate tank through flow restriction channels 148 and 174. The transmembrane pressure in the RO membrane unit 400 will not, however, be sufficient to produce a significant amount of permeate water).

After a timed interval to allow the retentate tank 200 to become almost empty, solenoid valve 132 is closed, and solenoid valve 110 is reopened. The opening of solenoid valve 110 allows the pressurized water supply to refill the retentate tank. The permeate production cycle is restarted, and refill sequence is repeated each time the retentate storage level falls to the control level 240. During the refill sequence purified water production continues.

The permeate production causes a net transfer of water from the retentate tank 200 to the permeate tank 500. At the point when the permeate water level reaches the top control level 530, an electrical signal is sent to the microprocessor, which causes the pressure pump 210 to be turned off. Further electrical signals are dispatched to open solenoid valves 126 and 128, and to activate the delivery pump 502 situated in the permeate tank 500. This sequence initiates the permeate "flush" cycle.

The delivery pump 502 discharges water from the permeate tank 500 back to the retentate tank 200 through the RO membrane unit 400 and the pre-filter unit 300. The permeate water flows into the RO membrane unit 400 in a reverse flow direction, entering the unit via port 406 and exiting via port 402. The reverse flow from the RO membrane unit 400 is then channeled to the pre-filter unit 300 entering via port 318 and exiting via port 326. The water flushed from the RO unit 400 and the pre-filter unit 300 the flows through channel 120, branching throughout channels 122 and 124 to flow back into the retentate storage tank 200. (Some of the permeate flush water can return to the retentate tank 200 by passing through channels 170 and 172 and the flow restriction channel 174, or through channels 144 and 146 and flow restriction channel 148. The pressure pump 210 incorporates three non-return valves which prevent return flows from entering the retentate tank via channel 120).

The return flows pass through the open solenoid valves 126 and 180. The internal ports in these valves are adapted to pass relatively high flows during the permeate flush operation. The high water velocities in the system during the water flushing cycle provide an effective means for removing water contaminants that would otherwise accumulate in the RO membrane unit 400 and the pre-filter unit 300, and cause a deterioration in the purification system performance. The frequent and automatic purging of the retentate water, and the regular permeate flush operation which takes place 4 or 5 times per hour, creates constant water movement throughout the system. The water dynamics prevents contaminate build-up in the system, even when no product water is drawn from the system. In essence, the operating system causes water transfers to continue, to and from the retentate and the permeate tank.

Permeate water is delivered from the system by activating the on/off switch incorporated in the delivery faucet 166. At any time when the faucet 166 is open, an electrical signal is set to the system microprocessor which causes the pressure pump 210 in the retentate tank 200 to stop the RO water production. A further electrical signal is then relayed to activate the delivery pump 502 in the permeate tank 500 to transmit purified water to the faucet. If the faucet 166 is opened during a system flush operation (which is indicated by a flashing LED display mounted on the faucet housing), the faucet 166 will continue to deliver the purified water, but at a reduced delivery rate. The reduced rate will remain in effect until the storage level in the permeate tank falls below level 540. When this happens, electrical signals are sent to the system microprocessor which provides further signals to close solenoid valves 126, and 180. The delivery pump 502 will then return to pumping water from the permeate tank 500 at the designed rate until the faucet 166 is turned off.

Conclusion, Ramifications, and Scope (1) The present invention provides a comprehensive and economical basis for the improved control, monitoring and performance of a cross-filtration system based on membrane processes. The invention discussed above consists of a water purification system with cross-filtration pre-filter and reverse osmosis membrane units. The inlets and outlets of these treatment elements are interconnected with an incoming water storage tank and a product water storage tank. All of the interconnecting conduits are embodied in a sealed manifold in a manner that allows reject water from the pre-filter and membrane units to be re-circulated and stored in the incoming water tank.

(2) The use of electrical power provides the basis for comprehensive control of the water purification system and enables a sophisticated method for purifying water to be developed. The electronic and electrical components of the system include; solenoids valves, which control the flows in the interconnected conduits, float level sensors, which provide a means for volume control in the storage tanks, pumps used to discharge water from each of the storage tanks, a water quality probe, a pressure differential switch, a regulating valve in the delivery faucet, and an electronic control board.

(3) The water purification system is managed by a unique operating system. This is governed by a microprocessor located on the electronics control board. Microprocessor control facilitates the use of a series of system operating sequences that allow (1) the incoming water tank to be automatically filled when required with supply water; (2) water to be processed and stored in the product water tank; (3) some of the product water to be regularly flushed back through the treatment system and returned to the incoming water tank; (4) delivery of product water to the faucet; and (5) purging of the incoming water tank in a manner of volume control that provides for fifty percent water recovery.

(4) Water treatment within the system is essentially continuous. The product water is usually subject to multiple passes through the pre-filter and reverse osmosis membrane units. Because this water processing always takes place at fixed design pressures, consistent and optimal contaminant removal is achieved at all times.

Furthermore, water wastage is minimized, and low flux ratios can be maintained.

(5) When the system is in a relatively steady state, with only a small volume of water being drawn from the permeate tank for consumption, and with the tanks relatively full, the system will exhibit an alternating flow pattern. Water from the incoming water tank is re-circulated for a period, and this produces an overall transfer from the incoming water tank to the product water tank. This sequence is followed with a period of flushing of the water from the product water tank via the pre-filter and Reverse Osmosis membrane to the incoming water tank. This continuous alternating flow is important for the prevention of the formation of bio-films within the system, which frequently occurs in systems where the water is static for long periods of time.

(6) The basic configuration of the elements of the water purification system and its mode of operation and control contribute to major improvements in system performance as compared with prior art systems.

(7) The scope of the invention is not restricted to the precise mode of system operation discussed above. Neither is the use of alternating flow sequences restricted to the precise manner of sequencing reviewed.

(8) The essential use of cross-flow filtration elements does not restrict the water purification application to the use of ceramic membranes at the pre-filtration stage, nor the use of reverse osmosis membranes in subsequent stages of water processing.

(9) The general method of purifying water can be equally applied with the use of membranes with higher molecular weight cutoffs, especially ultrafiltration membranes.

We claim:

1. A water purification system comprising:
   an inlet conduit for connection to a supply of water;
   a first storage reservoir tank connected to receive water from the inlet conduit;
   a reverse osmosis membrane unit, having a reverse osmosis membrane, connected via a pressure pump to the storage reservoir tank, said unit having a permeate water outlet for water which has passed through the membrane and a reject water outlet for receiving water not passing through the membrane;
   a second, permeate water storage tank connected to the permeate outlet;
   and a first reject water return conduit communicating the membrane unit reject water outlet with the first storage reservoir tank to allow recirculation of reject water for further purification;
   the system further comprising:
      means to initiate and conduct a repeating sequence of operations including a first operation in which supply water is drawn in through the inlet conduit until the level of water in the first tank reaches a first predetermined full level within the tank while water is prevented from being supplied from said first tank towards said membrane unit;
      a second operation in which the drawing in of supply water to the first storage tank is prevented while water is allowed to be supplied to the membrane unit and to be partitioned by the membrane unit into permeate and reject water, the reject water being returned to the first storage tank through the first return conduit and the permeate flowing to the second water storage tank until said water level in the first tank drops to a second predetermined level;
      and a third operation in which water remaining in the first storage tank is caused to be pumped to a drain outlet for a timed interval of sufficient length to substantially empty the first storage tank, said sequence of operations preventing formation of a biofilm within the system.

2. The system of claim 1, further comprising means to periodically flush the reverse osmosis membrane unit using permeate water returned from the second, permeate tank.

3. The system of claim 2, further comprising means to supply said returned permeate water used for the periodic flushing to the first storage reservoir tank.

4. The system of claim 2, further comprising an electronic timing mechanism for actuating the means for flushing in response to a volume of permeate in the second storage tank exceeding a first predetermined amount.

5. The system of claim 1, further comprising an ultraviolet light source for further purifying the permeate.

6. The system of claim 1, further comprising a pre-filter unit disposed between the first storage tank and the membrane unit.

7. The system of claim 6, wherein said pre-filter unit comprises a housing containing a cross-flow type filter element, an inlet, a first outlet for water having passed through said filter element, and a second outlet for water not passing through said filter element, said unit being constructed and arranged such that contaminant particles generally are swept with the flow of water from said inlet to said second outlet to substantially prevent said pre-filter unit from becoming blocked.

8. The system of claim 7, further comprising a second reject water return conduit communicating said pre-filter unit with said first storage tank.

9. The system of claim 8, wherein said first and second return conduits each connect to a joint reject water conduit that connects to the first storage tank.

10. The system of claim 8, further comprising a sealed manifold containing the reject conduits and containing conduits connecting the storage tanks, pre-filter unit and membrane unit.

11. The system of claim 7, wherein said filter element comprises an outer sleeve of silver impregnated ceramic material and an inner cylinder of block carbon.

12. The system of claim 6, further comprising a pressure differential switch to signal a dropping of pressure between the pre-filter unit and membrane unit indicating blockage of the pre-filter unit with contaminants.

13. The system of claim 1, wherein the means to conduct comprises a plurality of solenoid valves.

14. The system of claim 1, further comprising a delivery faucet and means to deliver permeate water from the second tank to the faucet upon demand.

15. The system of claim 1, further comprising a probe for indicating level of conductivity or total dissolved solids in the permeate.

16. The system of claim 1, further comprising a strainer to remove large contaminants from the supply of water.

* * * * *